Aug. 28, 1951     H. D. STONE     2,565,997
LOAD BRACING FRAME
Filed Aug. 9, 1949
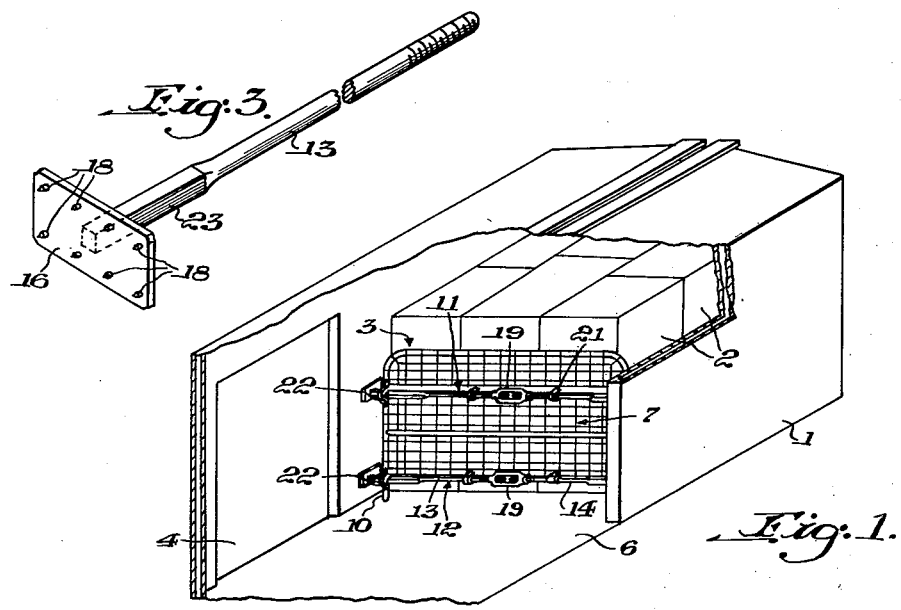
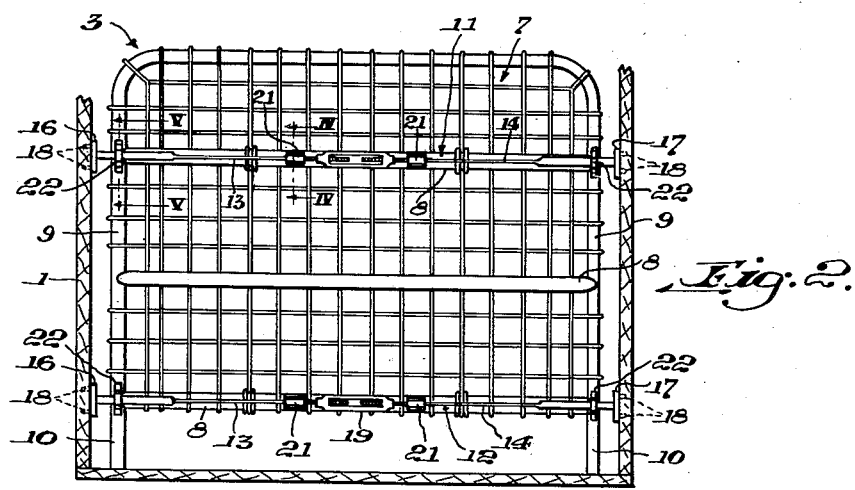
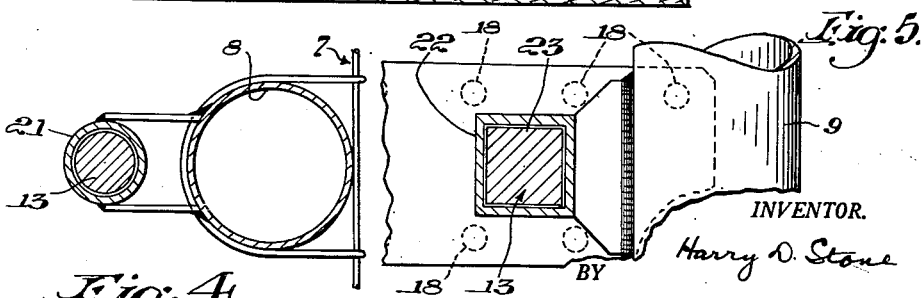
INVENTOR.
Harry D. Stone
BY Brown, Critchlow, Flick & Peckham
his ATTORNEYS Patented Aug. 28, 1951

2,565,997

UNITED STATES PATENT OFFICE 2,565,997

LOAD BRACING FRAME

Harry D. Stone, Uniontown, Pa., assignor to Pittsburgh Steel Company, Pittsburgh, Pa., a corporation of Pennsylvania Application August 9, 1949, Serial No. 109,315

4 Claims. (Cl. 105—369)

1

The invention relates to bulkheads and, in particular, to temporary, removable bulkheads for bracing loads as they are being transported in railway cars, trucks, ship holds and the like.

Broadly, the apparatus provided is suitable for use in these several types of freight haulage but, since the problem of providing light, inexpensive and reliable means for bracing railway freight car loads has proved to be most troublesome the description of the invention will be with respect to apparatus adapted for that use.

It is among the objects of this invention to provide a light, simple and inexpensive, temporary bulkhead for bracing material loaded into mobile open ended compartments, the bulkhead being so formed that it can be very quickly set up or removed.

A related object is to provide a bulkhead that is capable of securely bracing the load against shifting and also adapted to maintain its secure bracing force regardless of the normally experienced swaying or weaving movements of the compartment in which the load is being transported.

A further object is to provide a loading brace bulkhead for bracing railway car loads, the bulkhead being quickly and easily installed in any conventional railway car without the necessity of changing the structure of the car in any way.

According to the invention, the load-bracing apparatus includes a bulkhead on which are slidably carried, in transversely extending positions, at least one pair of bulkhead supporting braces, these braces being so mounted and of sufficient length that they may be moved laterally outwardly beyond the sides of the bulkhead. Further, each of the braces carries at its extreme end portions a plurality of spurs for the purpose of engaging the side walls of the compartment in which the load is being carried when the braces are moved outwardly. In addition, brace adjusting mechanism is provided for moving the braces outwardly into side-wall engaging position and, alternatively, for retracting the braces from their engaged position. Such adjusting mechanism is carried by the braces so as to be slidable with the braces which, as mentioned above, are slidably carried by the bulkhead. Most suitably, the adjusting mechanism is a turnbuckle connecting the inner ends of a pair of braces, these inner ends being threaded for this purpose and the braces of the pair being horizontally aligned, although, if desired, a ratchet wrench could be substituted for the turnbuckle.

With such an arrangement, it is a simple matter to place the load bracing apparatus against

2 the load and then force the braces into the side walls to support and hold the bulkhead in its load-bracing position. The fact that the braces are slidable with respect to the bulkhead is important to the invention since such an arrangement permits the braces to sway with the compartment while the bulkhead maintains its upright position. Were this not done, their spiked ends soon would be pulled or torn loose from one or the other side of the loaded compartment by the normally experienced swaying or weaving of the compartment as it moves over a railway bed, or the like. Also, the braces are specially formed in a manner to be described and are held against rotation so as to avoid the tendency of the spikes to rotate and thereby chew up the wooden side walls of the compartment and loosen the spike engagement.

The preferred embodiment of the invention is illustrated in the accompaying drawings of which Fig. 1 is a diagrammatic perspective view of a railway car showing the manner in which the car is loaded and the load braced by the apparatus provided by the invention; Fig. 2 a front elevation of the load-bracing apparatus; Fig. 3 a perspective of one member of one pair of the bulkhead supporting braces; and Figs. 4 and 5 sections along lines IV—IV and V—V of Fig. 2.

Referring to the drawings, Fig. 1 shows a conventional railway car 1 in which a load 2 has been placed, the load being held in place by means of load bracing apparatus, which, as seen, forms a temporary car bulkhead. Normally, two of these bulkheads are used, one to brace the load in each end of the car, and, in the manner to be explained, each of the bulkheads is self-supporting so that the load in either end of the car can be removed without disturbing the load in its other end. The car is formed with customary side door openings 4 and 6 to facilitate its loading and unloading, and it will be apparent that, when both ends of the cars are completely loaded, some space must be left between door openings 4 and 6 to provide working space for commencing the unloading operation. Consequently, the principal purpose of the bulkheads is to prevent the load in the ends from shifting into this open space between the door openings.

The particular load bracing apparatus shown (Fig. 2) includes a reticulated wall portion 7 mounted on horizontal and vertical, tubular steel members 8 and 9, the purpose of the reticulated wall being to obtain maximum lightness for the apparatus so as to facilitate its handling and, also, to securely hold in place loads formed of rather small articles. Tubular members 8 and 9 provide sufficient strength and rigidity so that a secure brace is formed for large and heavy articles. If desired, the bulkhead may be provided with feet 10 which rest on the car floor, although, as will become apparent the whole structure is so supported that such floor support is not necessary.

As mentioned above, the purpose of the bulkhead is to provide a temporary, removable means of bracing the load while it is being transported in a railway car or the like, and the problem which has been most difficult is that of providing a bulkhead which can rapidly and easily be set up or removed and which, at the same time, is inexpensive and provides a secure brace for the load regardless of the vibration to which the bracing means is subjected during travel. In the present invention, this problem is solved by the provision of pairs of horizontally extending bracing members 11 and 12, each of these pairs including two horizontally aligned rods 13 and 14 each carrying at its outer end plates 16 and 17 on which are formed a plurality of outwardly extending spurs, or spikes, 18. Further, the inner ends of rods 13 and 14 are threaded in opposite directions and are interconnected by means of conventional turnbuckles 19 so that, in effect, the two rods of each pair, along with their spiked bearing plates, form single connected units.

To hold bulkheads 3 in their load-bracing position, it, of course, is necessary that brace pairs 11 and 12 bear tightly against the bulkhead, but it is an important feature of this invention that these bracing units are carried by the bulkheads in such a manner that they are independently slidable with respect to them. Accordingly, rods 13 and 14 of each of these pairs or units are disposed in horizontal alignment with each other and with certain of the horizontal tubular steel bulkhead members 8, and they are slidably carried within inner and outer brackets 21 and 22 that are welded, or otherwise rigidly secured to these horizontal tubes.

As a result of this mounting, when it is desired to brace a bulkhead which has been positioned against a load, it only is necessary to rotate turnbuckle 19 to force rods 13 and 14 outwardly into such position that their spikes 18 are forced into the side walls of the car. The desirability of the slidable mounting of the bracing units becomes clear when it is considered that as a railway car moves over a rough bed, or around a steeply banked curve, the side walls of the car swing arcuately in one or the other direction to a greater extent than the floor of the car. Consequently, if brace pairs 11 and 12 were not slidable, the bulkhead, being in frictional engagement with the floor-supported load, would remain in a substantially vertical position while one or the other of the walls would move outwardly and tend to pull away from the spike engagement. With the slidable arrangement, the bulkhead can remain in its vertical position and the braces can move with the swinging or weaving movement of the side walls of the car. In other words, the slidable mounting of the pairs 11 and 12 is to assure that the spikes will remain in engagement with the side wall of the car.

A further feature of the invention is that rods 13 and 14 of the braces are mounted in such a manner that their rotation is prevented, it being quite apparent that the rods must be held against rotation when the turnbuckle is operated to move them outwardly into wall engagement. Also, it is equally important to prevent rotation after the spikes have been engaged since otherwise the spikes would chew up the wood in which they are embedded to such an extent that they would not be securely engaged therein. To prevent such rotation, each rod (Fig. 3) is formed with a squared outer end portion 23 and, as shown in Fig. 5, bracket 22, which carries this portion, is squared. Consequently, the squared edges of the bracket and end portion 23 prevent rotational movement of the rods. To further assure a firm engagement of the spurs, it may be desirable to make spur-bearing plates 16 and 17 sufficiently wide to cover two adjacent side wall boards of the car and, of course, to position the spurs so that they will engage each board. Of course, the inner, turnbuckle-engaging ends of the rods must be circular in cross section and, for reasons of manufacturing economy, it is preferred to make the major portion of the rod circular and, also, to round bracket 21 which carries this inner portion.

From the above, it will be seen that an inexpensive, easily handled and rapidly installable bulkhead is provided. The economy is achieved by the use of a conventional wire mesh wall mounted on standard steel tubular members. Further the bracing rods can be very economically formed and their ends threaded to receive standard turnbuckles or equivalent structures. Additional economy is effected in use, since the apparatus is quite light and maneuverable so that, if necessary, one man can set it up with very little difficulty. The turnbuckle mechanism for forcing the spurs into the car side walls facilitates the installation and, if desired, the two turnbuckles may be interconnected for simultaneous movement. Along with these improvements, it also is important to note that the apparatus is suitable for use in almost any freight car now being used and can be used in them without requiring the slightest change in, or addition to, the car structure. Finally, the action of the apparatus is superior because the sliding movement of the braces with car vibrations, as well as the use of non-rotatable braces, assures a firmly maintained load-bracing force.

According to the provisions of the patent statutes, I have explained the principle, preferred embodiment and mode of operation of my invention, and have illustrated and described what is now considered to represent its best embodiment. However, I desire to have it understood that, within the scope of the appended claims, the invention may be practiced otherwise than as specifically illustrated and described.

I claim:

1. Apparatus for bracing car loads comprising a bulkhead for engaging the load, and a bulkhead bracing mechanism, said mechanism including a pair of parallel rods extending substantially transversely of the bulkhead and having their outer ends formed to immovably engage opposed side walls of the car, said rods being mounted on and slidable with respect to said bulkhead, said slidable mounting permitting said rods to be moved outwardly beyond each side of the bulkhead for effecting their said side wall engagement and also permitting said bulkhead to slide longitudinally of the rods when so engaged, whereby said engaged rods support said bulkhead and said engagement remains substantially unaffected by said longitudinal bulkhead movements.

2. Apparatus for bracing car loads comprising a bulkhead for engaging the load and a pair of bulkhead bracing mechanisms, each of said pair including a pair of parallel rods each extending substantially transversely of the bulkhead and carrying at its outer end a plurality of spurs, and rod adjusting means rigidly interconnecting the inner ends of each pair of rods, said rods being mounted on and slidable with respect to said bulkhead for permitting said rods to be moved outwardly beyond each side of the bulkhead for engaging said spurs in opposed side walls of the car, said slidable mounting also permitting the bulkhead to slide longitudinally of the interconnected rods when so engaged whereby said engaged rods support said bulkhead and said engagement remains substantially unaffected by said longitudinal bulkhead movements.

3. Apparatus for bracing car loads comprising a bulkhead for engaging the load and a pair of bulkhead bracing mechanisms, each of said pair including a pair of parallel rods each extending substantially transversely of the bulkhead and carrying at its outer end a plurality of spurs, and a turnbuckle rigidly interconnecting the inner ends of each pair of rods, said rods being mounted on and slidable with respect to said bulkhead for permitting said rods to be moved outwardly beyond each side of the bulkhead for engaging said spurs in opposed side walls of the car, said slidable mounting also permitting the bulkhead to slide longitudinally of the interconnected rods when so engaged whereby said engaged rods support said bulkhead and said engagement remains substantially unaffected by said longitudinal bulkhead movements.

4. Apparatus for bracing car loads comprising a bulkhead for engaging the load, and a pair of bulkhead bracing mechanisms, each of said pair including a pair of parallel rods each extending substantially transversely of the bulkhead and carrying at its outer end a plurality of spurs, rod adjusting means rigidly interconnecting the inner ends of each pair of rods, brackets mounted on said bulkhead and slidably carrying said rods, said brackets permitting the rods to be moved outwardly beyond each side of the bulkhead for immovably engaging said spurs in opposed side walls of the car whereupon said engaged rods support and brace the bulkhead and also permit the bulkhead to slide longitudinally of the interconnected rods when so engaged whereby said rod engagement remains substantially unaffected by said longitudinal bulkhead movements, said rods and at least some of said brackets being so formed with respect to one another as to prevent rod rotation.

HARRY D. STONE.

REFERENCES CITED

The following references are of record in the file of this patent:

UNITED STATES PATENTS

| Number | Name | Date |
|---|---|---|
| 891,897 | Astrom | June 30, 1908 |
| 968,256 | Ogden | Aug. 23, 1910 |
| 969,002 | Teachout | Aug. 30, 1910 |
| 1,825,452 | Harris | Sept. 29, 1931 |
| 2,056,704 | Anderson | Oct. 6, 1936 |
| 2,227,807 | Dixon | Jan. 7, 1941 |
| 2,411,768 | Welch | Nov. 26, 1946 |
| 2,462,619 | Eisensmith | Feb. 22, 1949 |
| 2,476,362 | Fahland | July 19, 1949 |
| 2,497,683 | Nampa et al. | Feb. 14, 1950 |